(12) United States Patent
Yamasaki

(10) Patent No.: US 7,708,331 B2
(45) Date of Patent: May 4, 2010

(54) SEAT DEVICE OF VEHICLE

(75) Inventor: Hirokazu Yamasaki, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 12/143,062

(22) Filed: Jun. 20, 2008

(65) Prior Publication Data

US 2009/0021040 A1    Jan. 22, 2009

(30) Foreign Application Priority Data

Jul. 20, 2007    (JP) .................. 2007-189526

(51) Int. Cl.
*B60N 2/02* (2006.01)
(52) U.S. Cl. .................. 296/65.13; 296/65.11
(58) Field of Classification Search .............. 296/65.13, 296/65.01; 248/429, 430
See application file for complete search history.

(56) References Cited

U.S. PATENT DOCUMENTS

| | | | | |
|---|---|---|---|---|
| 2,839,312 | A * | 6/1958 | Barenyi et al. | 296/65.11 |
| 2,980,466 | A * | 4/1961 | Barenyi | 296/156 |
| 3,893,729 | A * | 7/1975 | Sherman et al. | 296/64 |
| 4,341,415 | A * | 7/1982 | Braun et al. | 296/64 |
| 5,529,378 | A * | 6/1996 | Chaban et al. | 297/331 |
| 5,636,884 | A * | 6/1997 | Ladetto et al. | 296/65.13 |
| 5,711,505 | A * | 1/1998 | Nemoto | 296/65.14 |
| 5,947,541 | A * | 9/1999 | Behrens et al. | 296/64 |
| 5,951,084 | A * | 9/1999 | Okazaki et al. | 296/37.16 |
| 6,113,175 | A * | 9/2000 | Guim et al. | 296/65.18 |
| 6,129,404 | A * | 10/2000 | Mattarella et al. | 296/65.09 |
| 6,129,405 | A * | 10/2000 | Miyahara et al. | 296/65.11 |
| 6,145,910 | A * | 11/2000 | Baldas et al. | 296/65.01 |
| 6,145,913 | A * | 11/2000 | Odagaki | 296/65.11 |
| 6,286,886 | B1 * | 9/2001 | Odagaki | 296/65.11 |
| 6,425,619 | B2 * | 7/2002 | Ney | 296/65.15 |
| 6,435,590 | B2 * | 8/2002 | Miyahara et al. | 296/65.11 |
| 6,505,805 | B2 * | 1/2003 | Fuller | 248/429 |
| 6,609,745 | B2 * | 8/2003 | Miyahara et al. | 296/65.11 |
| 6,616,230 | B2 * | 9/2003 | Niikura | 297/311 |

(Continued)

FOREIGN PATENT DOCUMENTS

EP    1060944 A1    12/2000

(Continued)

OTHER PUBLICATIONS

European Search Report; EP08012108; Dated Oct. 8, 2008.

*Primary Examiner*—Kiran B. Patel
(74) *Attorney, Agent, or Firm*—Studebaker & Brackett PC; Donald R. Studebaker

(57) ABSTRACT

A seat slides in a vehicle longitudinal direction between a pair of wheel houses projecting inside a vehicle compartment, and slides in s vehicle width direction at a portion which is in front of the wheel houses. The seat takes a first position in which its outside portion overlaps with the wheel houses in the vehicle width direction, and a second position in which its rear portion overlaps with the wheel houses in the vehicle longitudinal direction. There is provided a rearward-slide restriction device operative to restrict rearward slide of the rear seat in the first position. Accordingly, there is provided a seat device of a vehicle which can prevent any improper interference of the seat with the wheel houses, ensuring a proper long slide function of the seat.

5 Claims, 11 Drawing Sheets

U.S. PATENT DOCUMENTS

| | | | |
|---|---|---|---|
| 6,648,393 B1 * | 11/2003 | Milnar et al. | 296/65.11 |
| 6,685,269 B1 * | 2/2004 | Freijy et al. | 297/332 |
| 6,827,388 B2 * | 12/2004 | Kayumi et al. | 296/64 |
| 6,869,121 B2 * | 3/2005 | Kayumi et al. | 296/37.15 |
| RE38,845 E * | 10/2005 | Odagaki | 296/65.11 |
| 7,007,997 B1 * | 3/2006 | Wieczorek et al. | 296/65.03 |
| 7,023,108 B2 * | 4/2006 | Itami et al. | 307/10.1 |
| RE39,101 E * | 5/2006 | Miyahara et al. | 396/65.11 |
| 7,073,764 B2 * | 7/2006 | Matsushiro | 248/424 |
| 7,191,981 B2 * | 3/2007 | Laib et al. | 244/118.6 |
| 7,229,117 B2 * | 6/2007 | Okuda et al. | 296/64 |
| 7,243,995 B2 * | 7/2007 | Nakaya et al. | 297/378.1 |
| 7,252,319 B2 * | 8/2007 | Toyota et al. | 296/65.09 |
| 7,374,243 B2 * | 5/2008 | Kayumi et al. | 297/335 |
| 7,380,859 B2 * | 6/2008 | Gardiner | 296/64 |
| 7,393,038 B2 * | 7/2008 | Yajima et al. | 296/65.03 |
| 7,441,822 B1 * | 10/2008 | Day | 296/65.11 |
| 7,578,536 B2 * | 8/2009 | Yajima et al. | 296/65.03 |
| 2002/0011737 A1 * | 1/2002 | Miyahara et al. | 296/65.11 |
| 2003/0184112 A1 * | 10/2003 | Furui | 296/65.01 |
| 2005/0285007 A1 * | 12/2005 | Tanaka | 248/429 |
| 2006/0231719 A1 * | 10/2006 | Kayumi et al. | 248/429 |
| 2007/0013218 A1 * | 1/2007 | Kayumi et al. | 297/344.1 |

FOREIGN PATENT DOCUMENTS

| | | |
|---|---|---|
| EP | 1228922 A1 | 8/2002 |
| EP | 1790523 A1 | 5/2007 |
| JP | 10203210 | 8/1998 |
| JP | 2000-264109 | 9/2000 |
| JP | 2000264109 A | 9/2000 |
| JP | 2003-205775 | 7/2003 |

* cited by examiner

SEAT DEVICE OF VEHICLE

BACKGROUND OF THE INVENTION

The present invention relates to a seat device of a vehicle, in which a seat is provided in a vehicle compartment so as to slide in a vehicle longitudinal direction between a pair of wheel houses, which are provided so as to project inside the vehicle compartment, and slide in a vehicle width direction at a portion which is in front of the wheel houses.

Conventionally, a seat disclosed in Japanese Patent Laid-Open Publication No. 2000-264109 is known as the above-described seat device. It is a second-row seat (rear seat), which is provided in back of a first-row seat with a driver seat and a passenger seat, which comprises a center seat, a left seat and a right seat. The center seat, which has a relatively small width in the vehicle width direction, is located at the center between the left and right seats which have a normal width.

The above-described center seat is provided so as to slide in the vehicle longitudinal direction and the right and left seats are provided so as to slide in the vehicle longitudinal direction between a pair of wheel houses and slide in the vehicle width direction at a portion which is in front of the wheel houses.

Herein, by making the center seat slide forward and then making the right and left seats slide inward respectively until each side face of the both seats contacts one another from the normal position of the second-row seat, the whole width of the right and left seats contacting can be short enough to allow the right and left seats to slide rearward so as to be located right between the pair of wheel houses. As a result, there can be provided a wide foot space to a passenger seated in this second-row seat.

However, the conventional seat device of a vehicle which is disclosed in the above-described publication fails to provide any means for restricting the rearward slide of the right and left seats, which are located in front of the wheel houses with each outside portion thereof overlapping with the wheel houses in the vehicle width direction, in order to prevent interference with the wheel houses.

SUMMARY OF THE INVENTION

Accordingly, an object of the present invention is to provide a seat device of a vehicle which can prevent any improper interference of the seat with the wheel houses, ensuring a proper long slide function of the seat.

According to the present invention, there is provided a seat device of a vehicle, comprising a seat provided in a vehicle compartment so as to slide in a vehicle longitudinal direction between a pair of wheel houses, which are provided so as to project inside the vehicle compartment, and slide in a vehicle width direction at a portion which is in front of the wheel houses, the seat being configured to take a first position in which the seat is located forward and an outside portion thereof overlaps with the wheel house in the vehicle width direction, and a second position in which the seat is located between the pair of wheel houses and a rear portion thereof overlaps with the wheel houses in the vehicle longitudinal direction, and a rearward-slide restriction device operative to restrict rearward slide of the seat which is in the first position.

According to the present invention, since the rearward-slide restriction device restricts the rearward slide of the seat in the first position in which the seat is located forward and the outside portion thereof overlaps with the wheel house in the vehicle width direction, the rearward slide of the seat in the first position can be prevented properly, thereby preventing any improper interference of the seat with the wheel houses. Also, any pinch of a seatbelt is prevented, so that any damage of a trim and the like which may be caused by the pinch can be prevented. Further, since the seat is allowed to slide laterally from the first position to the second position, it can be made slide rearward avoiding the wheel houses, thereby ensuring the proper long slide function of the seat.

According to an embodiment of the present invention, the seat comprises a seat cushion which is supported so as to slide in the vehicle width direction, and the rearward-slide restriction device comprises a restriction portion that is provided at a vehicle floor and an engagement portion that is provided on a side of the seat cushion so as to engage with the restriction portion when the seat cushion is in the first position. Thereby, since the rearward slide of the seat in the first position is restricted by the engagement portion engaging with the restriction portion when the seat cushion moves to the first position, the restriction of the rearward slide can be conducted properly by using the move of the seat cushion to the first position.

According to another embodiment of the present invention, the seat comprises a seat cushion which is supported so as to slide in the vehicle width direction, and the rearward-slide restriction device comprises a restriction portion that is provided at a vehicle floor and an engagement portion that is provided on a side of the seat cushion so as to disengage from the restriction portion when the seat cushion slides inward from the first position. Thereby, since the engagement portion disengages from the restriction portion to release the engagement between the both portions when the seat cushion slides inward from the first position, the restriction of the rearward slide of the seat can be disabled properly by using the inward lateral move of the seat cushion.

According to another embodiment of the present invention, the restriction portion is formed at a slide rail extending in the vehicle longitudinal direction. Thereby, the restriction of the rearward slide of the seat can be conducted by using the longitudinal slide rail.

According to another embodiment of the present invention, the rearward-slide restriction device is configured to allow a specified amount of longitudinal slide of the seat. Thereby, the longitudinal slide of the seat can be allowed in a specified range without any interference with the wheel houses.

According to another embodiment of the present invention, the seat is a second-row seat which comprises a pair of right and left seats that is provided independently in the vehicle compartment. Thereby, the rearward-slide restriction device can be applied to the right and left seats of the second-row seat, thereby further improving utility of the seat.

According to another embodiment of the present invention, in back of the second-row seat is provided a third-row seat which is storable behind the second-row seat. Thereby, there can be provided two modes: one is that the second-row seat and the third-row seat provide seat spaces to passengers respectively; the other is that the third-row seat is stored and the second-row seat slides rearward enough to provide a wide foot space to a passenger seated in the second-row seat.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
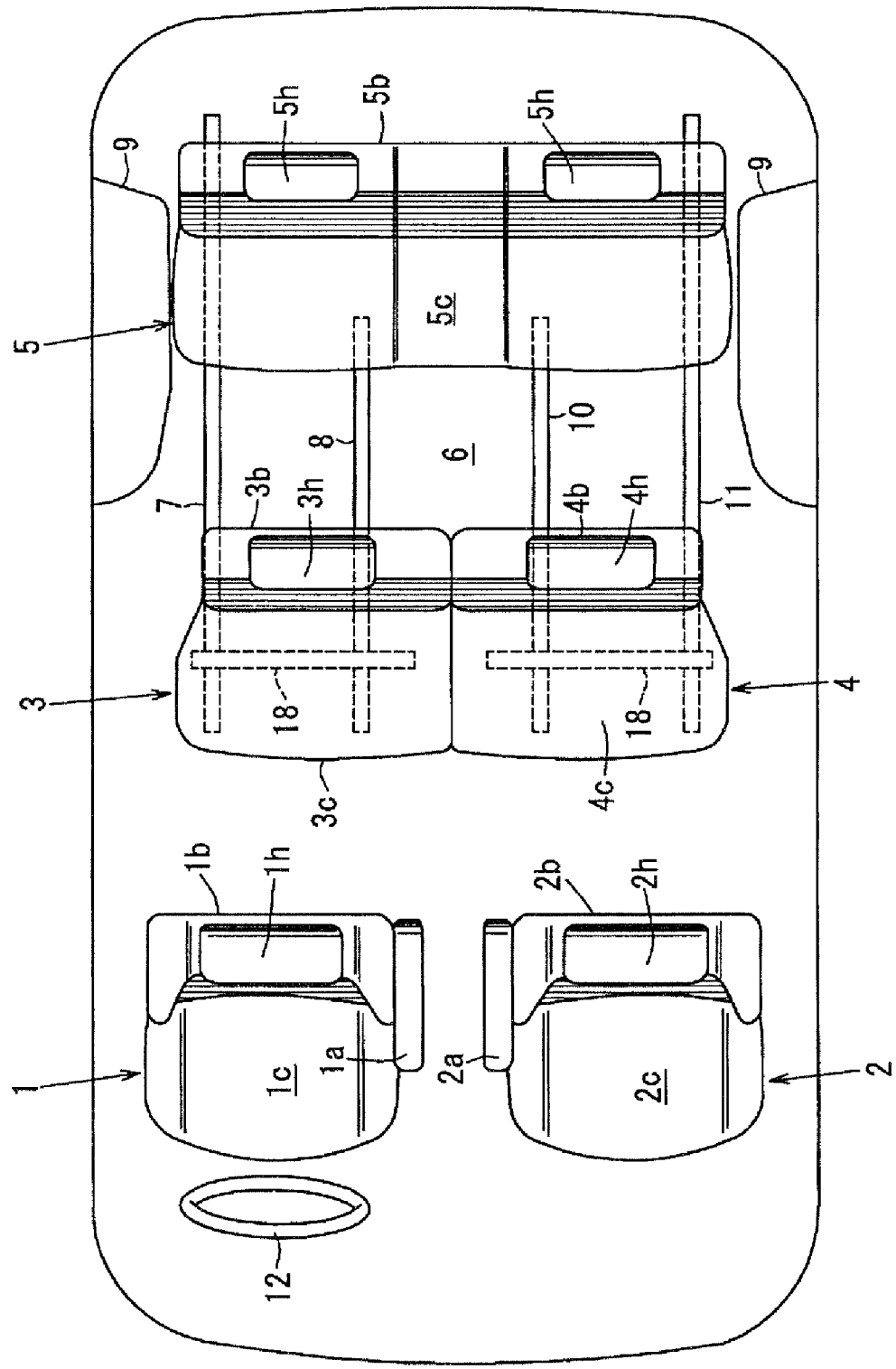
FIG. 1 is a schematic plan view of a seat device of a vehicle according to a first embodiment of the present invention.

Figures show a seat device of a vehicle. In FIG. 1, the seat device of a vehicle comprises a driver seat 1 including a seat cushion 1c, a seat back 1b, a headrest 1h and an armrest 1a, and a passenger seat 2 including a seat cushion 2c, a seat back 2b, a headrest 2h and an armrest 2a, which constitute a first-row seat (front seat).

In back of the first-row seat is provided a second-row seat that comprises a right-side rear seat 3 including a seat cushion 3c, a seat back 3b and a headrest 3h, and a left-side rear seat 4 including a seat cushion 4c, a seat back 4b and a headrest 4h. The right-side and left-side rear seats 3, 4 are provided independently to be separate from one another. Further, behind the second-row seat is provided a third-row seat that comprises a bench seat type rear seat 5 including a seat cushion 5c, a seat back 5b and plural headrests 5h, 5h.

The respective seats 1, 2, 3, 4, 5 are provided on a floor panel 6, and the right-side rear seat 3 of the second-row seat is configured to be movable in a vehicle longitudinal direction (longitudinally) along longitudinal slide rails 7, 8 as a seat slide rail. Likewise, the left-side rear seat 4 of the second-row seat is configured to be movable in the vehicle longitudinal direction (longitudinally) along longitudinal slide rails 10, 11 as another seat slide rail.

The longitudinal slide rails 7, 8, 10, 11 are comprised of long slide rails which are disposed on the floor panel 6 in parallel. Both-side slide rails 7, 11 are longer than the center slide rails 8, 10. The both-side slide rails 7, 11 extend rearward until a rear portion which is located behind a pair of wheel houses 9, 9. The rear seat 5 of the third-row seat is configured to slide longitudinally along the both-side longitudinal slide rails 7, 11. Herein, in FIG. 1, reference character 12 denotes a steering wheel.

Figure 2:
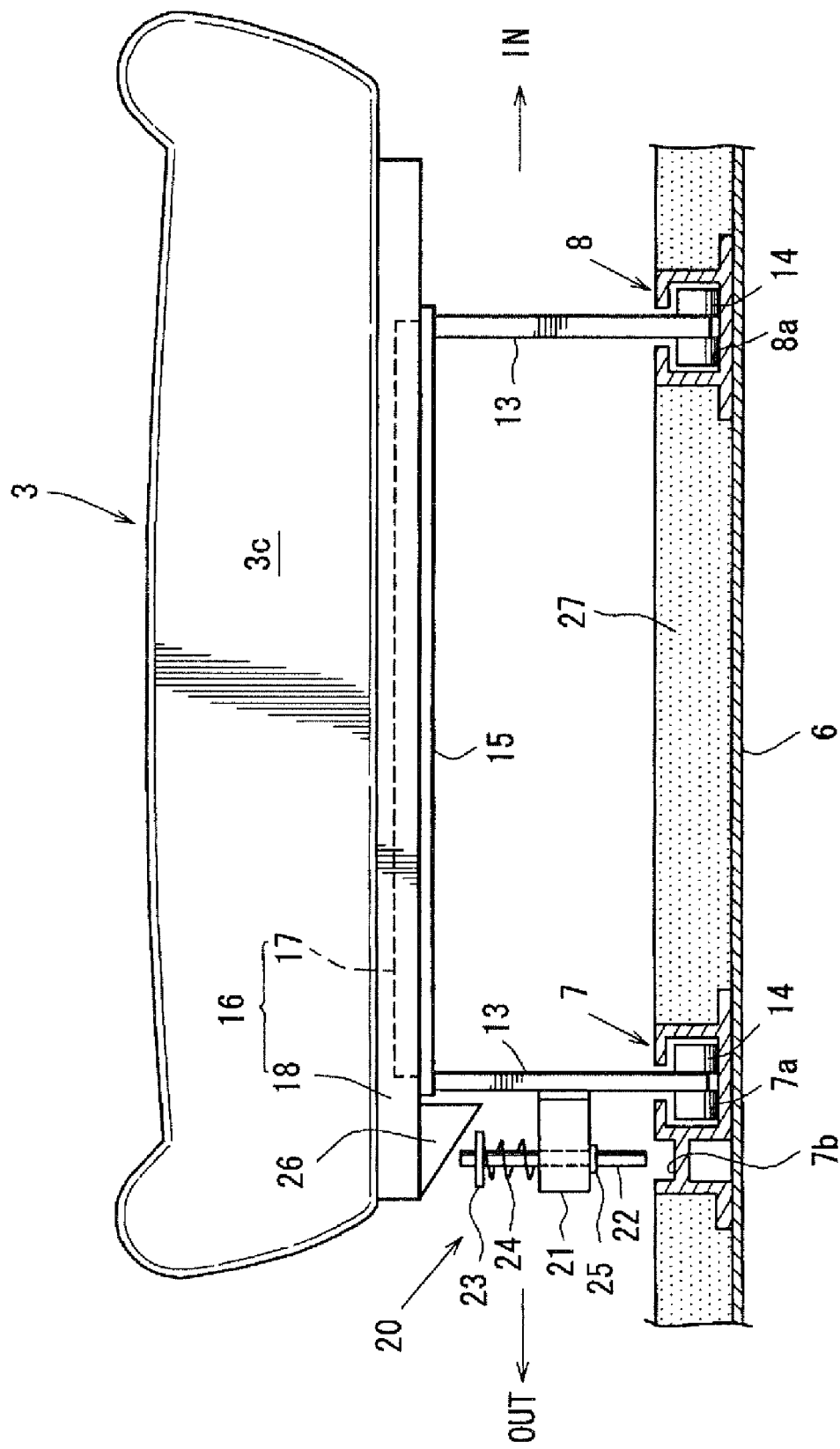
FIG. 2 is an elevation view showing a support structure of a right-side rear seat of a second-row seat shown in FIG. 1.
Figure 3:
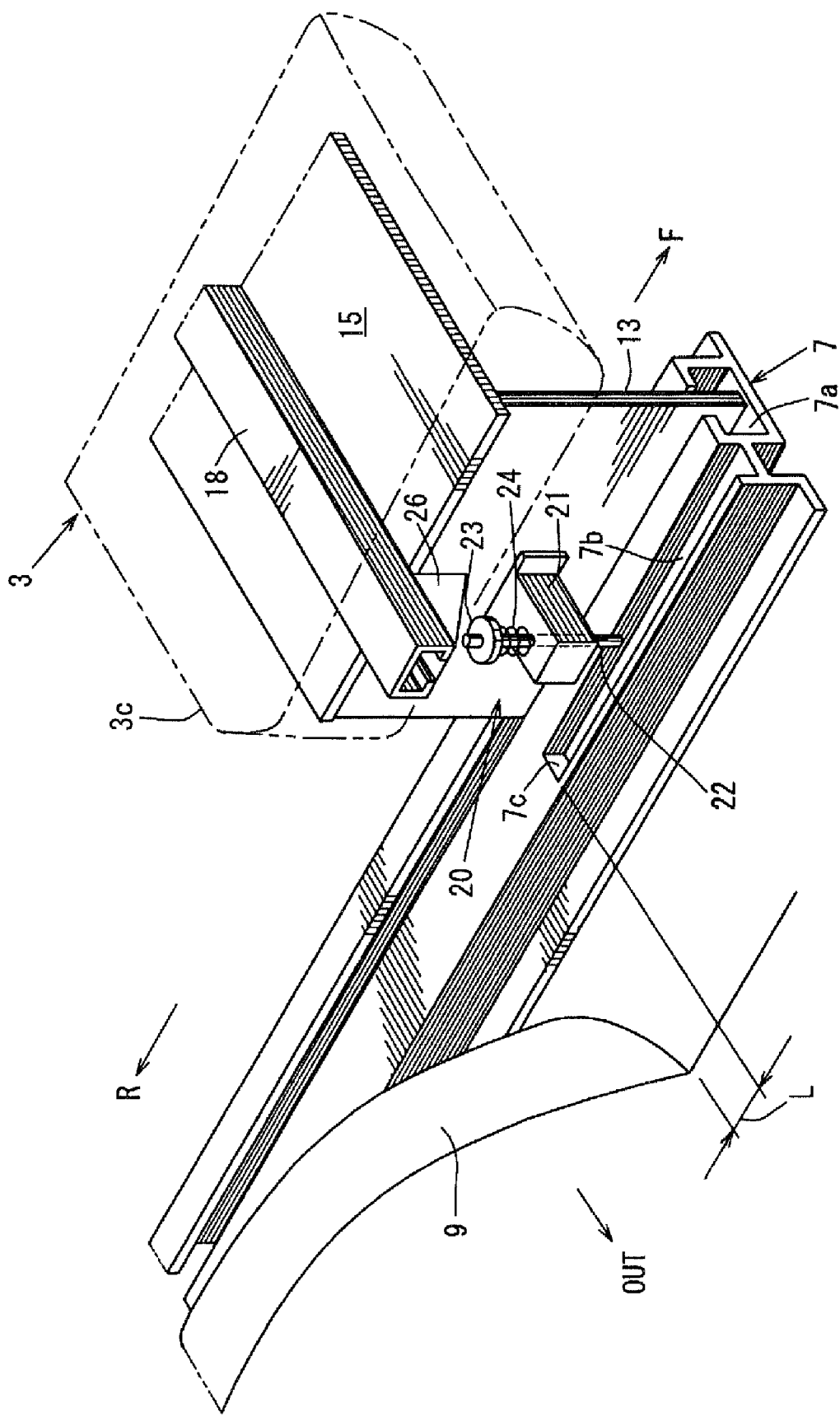
FIG. 3 is a perspective view of a major portion of the structure shown in FIG. 2.

FIG. 2 is an elevation view showing a support structure of the right-side rear seat 3 of the second-row seat. FIG. 3 is a perspective view of a major portion of the structure shown in FIG. 2. As shown in FIGS. 2 and 3, a pair of seat legs 13, 13 is provided below the seat cushion 3c of the right-side rear seat 3. The seat legs 13, 13 are movable along the above-described longitudinal slide rails 7, 8, below which are provided a pair of rollers 14, 14 rotating in and along respective rail grooves 7a, 8a.

Further, a horizontal bracket 15 is provided between both upper end portions of the seat legs 13, 13. On the upper face of the bracket 15 is provided a lateral slide rail 16 so as to extend in the vehicle width direction. The lateral slide rail 16 comprises a lower rail 17 which is directly fixed to the upper face of the bracket 15, and an upper rail 18 which is movable laterally along the lower rail 17. The upper rail 18 is fixed to a seat frame, not illustrated, which is disposed in the seat cushion 3c at its upper face.

Thus, the right-side rear seat 3 can slide in the vehicle width direction along the lateral slide rail 16 at a portion which is in front of the wheel houses 9. Likewise, the left-side rear seat 4, which is provided symmetrically relative to the support structure of the right-side rear seat 3, is configured to slide in the vehicle width direction along the lateral slide rail 16 at the portion which is in front of the wheel houses 9.

Herein, by making the both seats 3, 4 slide outward respectively along the lateral slide rail 16 from the state shown in FIG. 1 (i.e., the state in which the both seats 3, 4 is made slide inward until each side face of the both seats contacts or approaches to one another), there is provided a first position (see FIG. 5) in which each outside portion of the both seats 3, 4 overlaps with the wheel houses 9, 9 in the vehicle width direction.

The rear seat 5 of the third-row seat is configured as a so-called tip-up type of seat, in which the seat cushion 5c is rotated (folded) toward the seat back 5b so as to be stored rearward. Herein, by making the seat cushion 5c of the rear seat 5 of the third-row seat in the tip-up state and then by making the both seats 3, 4 of the second-row seat slide rearward respectively along the longitudinal slide rails 7, 8, 10, 11 from the state shown in FIG. 1, there is proved a second position, as shown in FIG. 6, in which the seats 3, 4 are located between the wheel houses 9, 9 and their rear portions overlap with the wheel houses 9, 9 in the vehicle longitudinal direction. Thus, the rear seats 3, 4 of the second-row seat are provided so as to be movable between the first position shown in FIG. 5 and the second position shown in FIG. 6.

Figure 4:
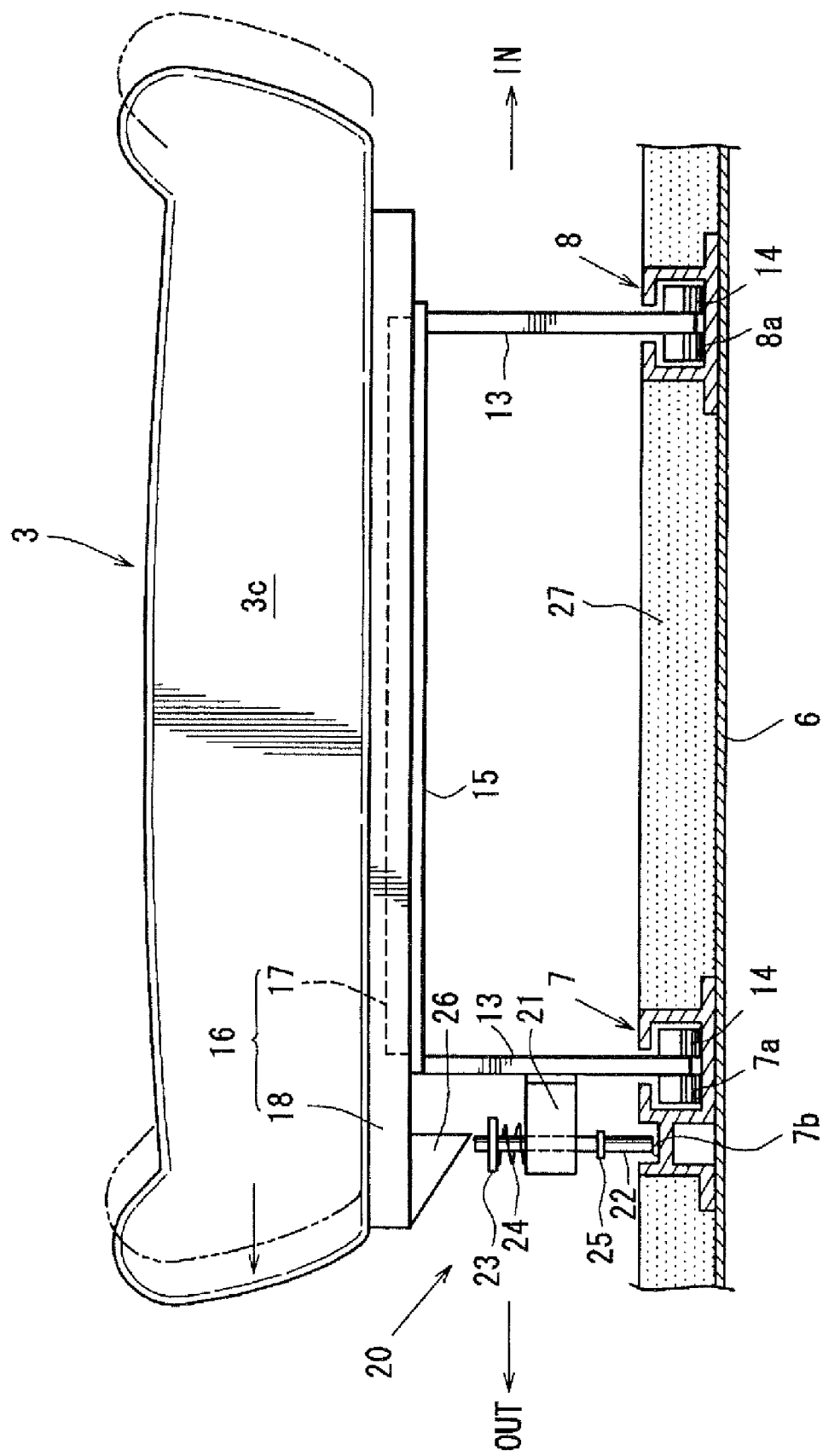
FIG. 4 is an elevation view of a state in which the right-side rear seat of the second-row seat is laterally slid to a first position thereof.
Figure 5:
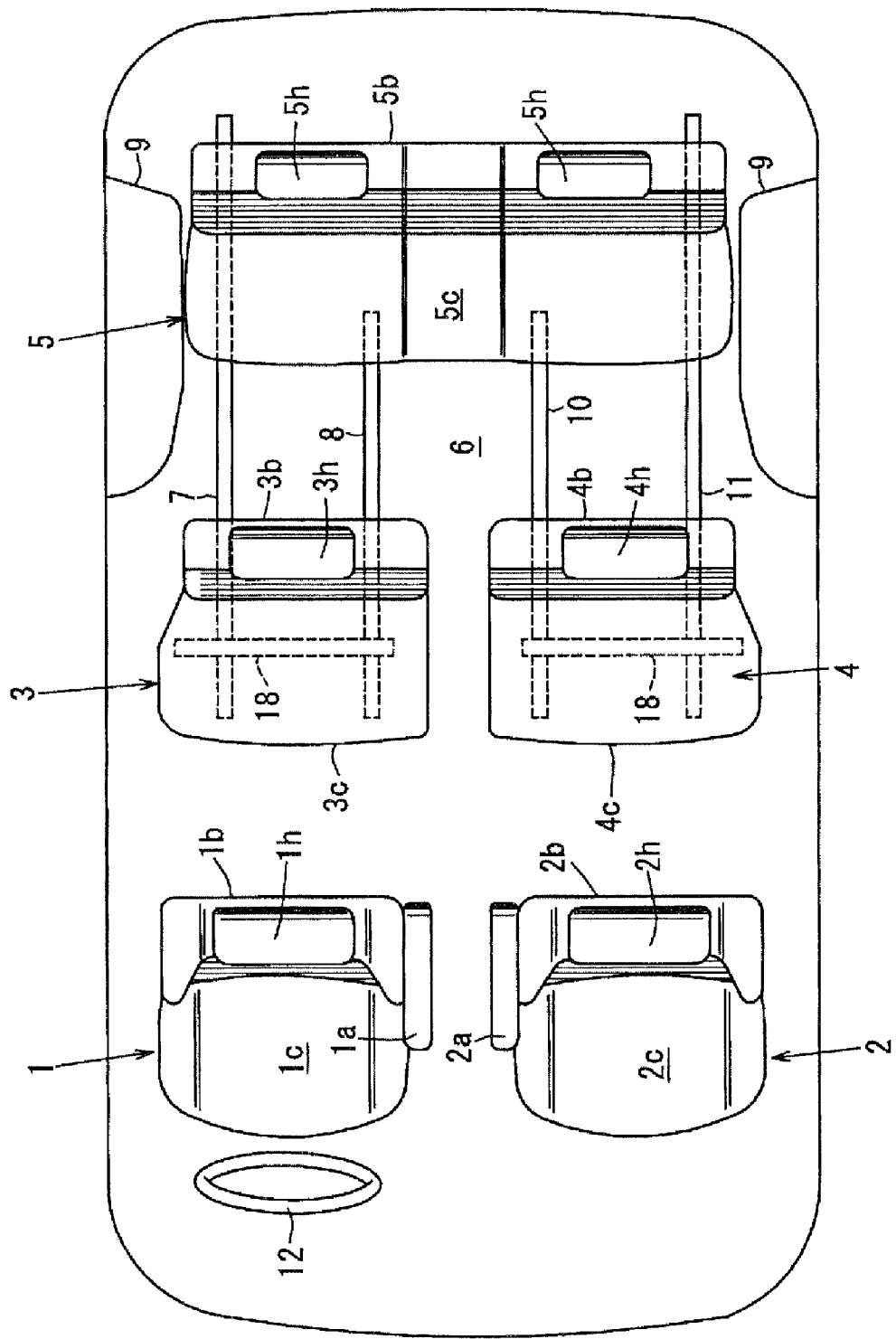
FIG. 5 is a plan view of a state in which both seats of the second-row seat are laterally slid to a first position thereof.
Figure 6:
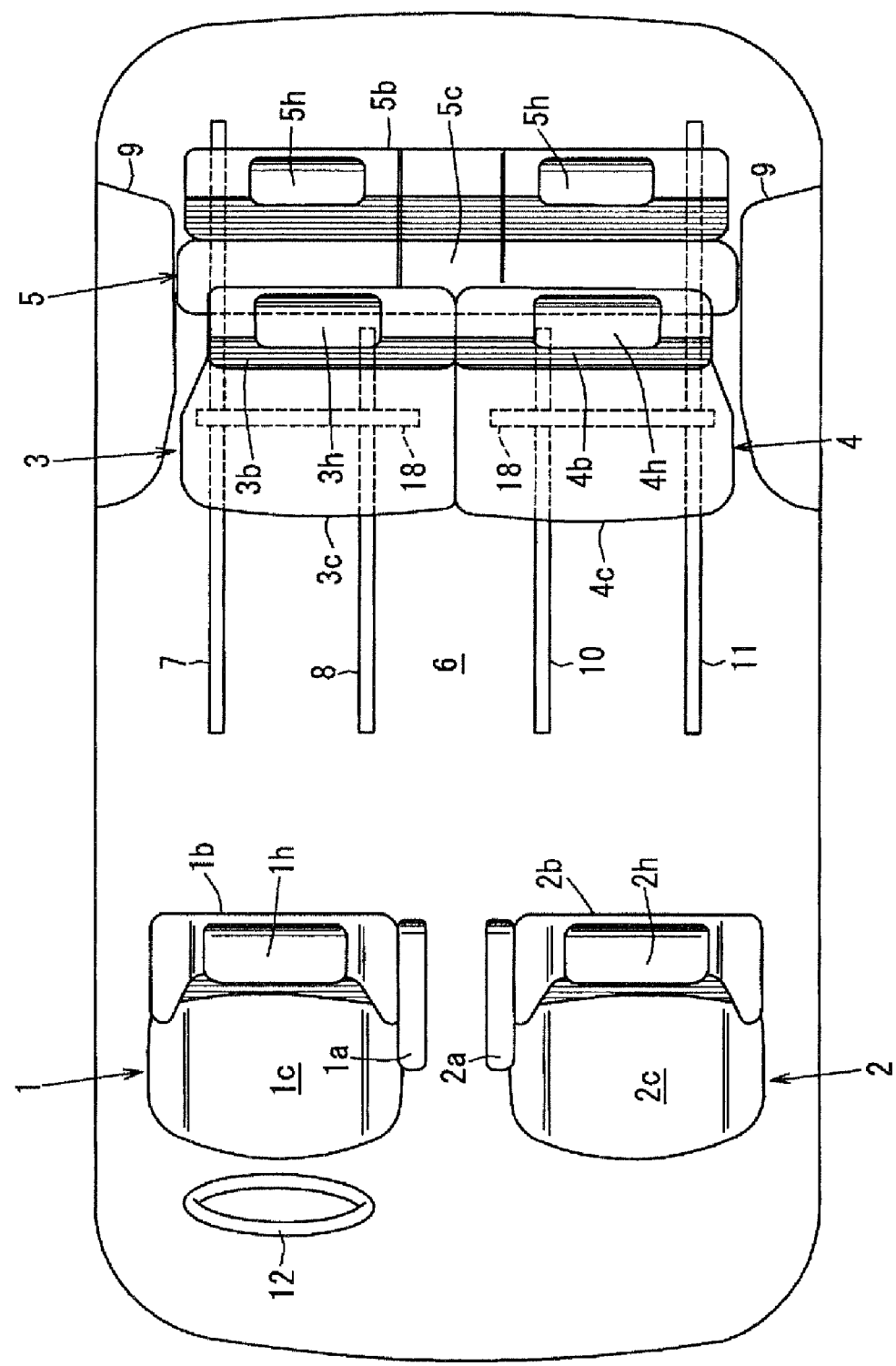
FIG. 6 is a plan view of a state in which the both seats of the second-row seat are laterally slid to a second position thereof.

A rearward-slide restriction device 20, which restricts rearward slide of the rear seat 3 of the second-row seat which is in the first position shown in FIG. 5, is configured as shown in FIGS. 2, 3 and 4. That is, outside the rail groove 7a of the longitudinal slide rail 7 is formed a recess groove 7b which extends longitudinally in parallel to the rail groove 7a. A restriction wall 7c (see FIG. 3) is provided at a rear terminal portion of the recess groove 7b. Herein, the restriction wall 7c is located in front of the front end of the wheel house 9 by a specified distance L (see FIG. 3).

Further, to an outside face of the outside seat leg 13 is attached a stopper 22 which is movable vertically via a holder 21. A spring retainer 23 is provided at an upper portion of the stopper 22, and between the lower face of the spring retainer 23 and the upper face of the holder 21 is provided a coil spring 24 operative to bias the stopper 22 upward. Further, an engagement ring 25 to restrict an excessive upward move of the stopper 22 by the coil spring 24 is provided at a portion of the stopper 22 that corresponds to the lower face of the holder 21.

Further, a cam 26 is attached to the lower face of the outside portion of the upper rail 18 of the slide rail 16. This cam 26 is operative to push down the stopper 22 against the biasing force of the coil spring 24 when the seat cushion 3c slides outward so that the rear seat 3 is in the first position.

In the state shown in FIG. 2, namely when the seat cushion 3c is made slide inward, the upper end of the stopper 22 is away from the lower face of the cam 26, so that the lower portion of the stopper 22 is located above the recess groove 7b of the longitudinal slide rail 7.

When the seat cushion 3c is made slide outward so that the rear seat 3 is changed to the first position (see FIGS. 4 and 5) from the state shown in FIG. 2 to the one shown in FIG. 4, the cam 26 at the lower face of the upper rail 18 pushes down the stopper 22 so that the lower portion of the stopper 22 gets into the recess groove 7b of the longitudinal slide rail 7. Accordingly, in case that the rear seat 3 slides rearward, the rearward slide of the rear seat 3 is allowed until the stopper 22 contacts the restriction wall 7c, but further rearward movement of that is restricted.

Herein, in a range where the stopper 22 does not contact the restriction wall 7c, the specified amount of longitudinal slide of the rear seat 3 is allowed even if the lower portion of the stopper 22 is in the recess groove 7b.

Meanwhile, when the seat cushion 3c is made slide inward from the state shown in FIG. 4, the pushing down of the stopper 22 by the cam 26 is released, so that the lower portion of the stopper 22 gets out of the recess groove 7b of the longitudinal slide rail 7 as shown in FIG. 2. Accordingly, the long slide of the rear seat 3 along the longitudinal slide rails 7, 8 becomes available.

Thus, the rear seat 3 comprises the seat cushion 3c that can slide in the vehicle width direction, and the above-described rearward-slide restriction device 20 comprises a restriction portion (see the recess groove 7b with the restriction wall 7c) operative to restrict the rearward slide of the rear seat 3 provided at the longitudinal slide rail 7 on the floor panel 6 and an engagement portion (see the stopper 22) operative to engage with the above-described restriction portion (see the recess groove 7b) when the seat cushion 3c is in the first position.

Herein, although illustration of the rearward-slide restriction device 20 of the left-side rear seat 4 of the second-row seat is omitted here, the rearward-slide restriction device 20 is actually provided with the symmetrically same structure as the one 20 of the right-side rear seat 4 shown in FIGS. 2 through 4. Reference character 27 denotes a floor mat in the figures. Arrow F shows the forward direction of vehicle, R shows the vehicle rearward direction, IN shows the vehicle inward direction, and OUT shows the vehicle outward direction, respectively.

Thus, the seat device of a vehicle of the present embodiment shown in FIGS. 1 through 6, comprises the rear seats 3, 4 provided in the vehicle compartment so as to slide in the vehicle longitudinal direction between the wheel houses 9, which are provided so as to project inside the vehicle compartment, and slide in the vehicle width direction at the portion which is in front of the wheel houses 9, the rear seats 3, 4 being configured to take the first position (see FIG. 5) in which the rear seats 3, 4 are located forward and the outside portions thereof overlap with the wheel houses 9 in the vehicle width direction, and the second position (see FIG. 6) in which the rear seats 3, 4 are located between the wheel houses 9 and the rear portions thereof overlap with the wheel houses 9 in the vehicle longitudinal direction, and the rearward-slide restriction device 20 (see FIGS. 1, 2, 4, 5 and 6) operative to restrict rearward slide of the rear seats 3, 4 which are in the first position (see FIG. 5).

According to the seat device, since the rearward-slide restriction device 20 restricts the rearward slide of the rear seats 3, 4 in the first position (see FIG. 5) in which the rear seats 3, 4 are located forward and the outside portion thereof overlaps with the wheel houses 9 in the vehicle width direction, the rearward slide of the rear seats 3, 4 in the first position (see FIG. 5) can be prevented, thereby preventing any improper interference of the rear seats 3, 4 with the wheel houses 9. Also, any pinch of a seatbelt is prevented, so any damage of a trim and the like can be prevented.

Further, since the rear seats 3, 4 are allowed to slide laterally from the first position (see FIG. 5) to the second position (see FIG. 6), they can be made slide rearward avoiding the wheel houses 9, thereby ensuring the proper long slide function of the rear seats 3, 4.

Further, the rear seats 3, 4 comprise the seat cushions 3c, 4c which are supported so as to slide in the vehicle width direction, and the rearward-slide restriction device 20 comprises the restriction portion (see the recess groove 7b) that is provided at the vehicle floor (see the floor panel 6) and the engagement portion (see the stopper 22) that is provided on the side of the seat cushions 3c, 4c so as to engage with the restriction portion (see the recess groove 7b) when the seat cushions 3c, 4c are in the first position (see FIGS. 4 and 5) (see FIGS. 2 through 4).

Thereby, since the rearward slide of the rear seats 3, 4 in the first position (see FIGS. 4 and 5) is restricted by the engagement portion (see the stopper 22) engaging with the restriction portion (see the recess groove 7b) when the seat cushions 3c, 4c move to the first position, the restriction of the rearward slide can be conducted by using the move of the seat cushions 3c, 4c to the first position.

Further, the restriction portion (see the recess portion 7b) is formed at the slide rail 7 extending in the vehicle longitudinal direction (see FIG. 3). Thereby, the restriction of the rearward slide of the rear seats 3, 4 can be conducted by using the longitudinal slide rail 7.

Additionally, the restriction portion (see the recess portion 7b) is configured to allow the specified amount of longitudinal slide of the rear seats 3, 4. Thereby, the longitudinal slide of the rear seats can be allowed in the specified range without any interference with the wheel houses 9.

Further, the rear seats 3, 4 of the second-row seat are provided independently in the vehicle compartment. Thereby, the rearward-slide restriction device 20 can be applied to the right and left seats 3, 4 of the second-row seat, thereby further improving utility of the seats.

Also, in back of the second-row seat (see the rear seats 3, 4) is provided the third-row seat (see the rear seat 5) which is storable behind the second-row seat. Thereby, two modes can be provided. One is that the second-row seat and the third-row seat provide seat spaces to passengers respectively. The other is that the third-row seat is stored and the second-row seat slides rearward enough to provide a wide foot space to a passenger seated in the second-row seat.

Figure 7:
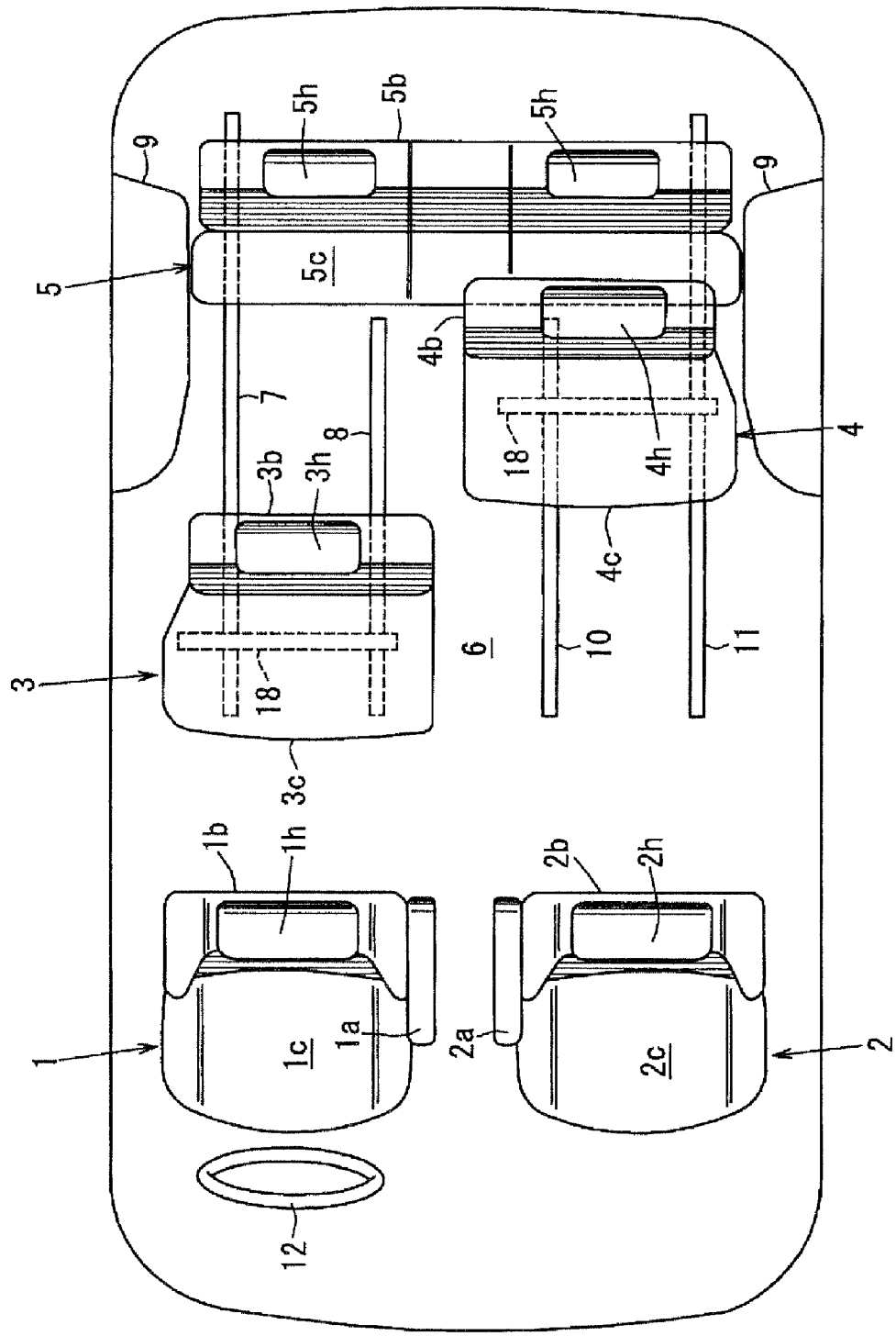
FIG. 7 is a plan view showing another seat arrangement.

Further, the above-described seat device can provide a mode, as shown in FIG. 7, in which either one of the second-row seat (see the right-side rear seat 3 of FIG. 7) takes the first position, and the other seat (see the left-side rear seat 4 of FIG. 7) takes the second position. Thereby, the variation of the seat arrangement can be improved.

Embodiment 2

Figure 8:
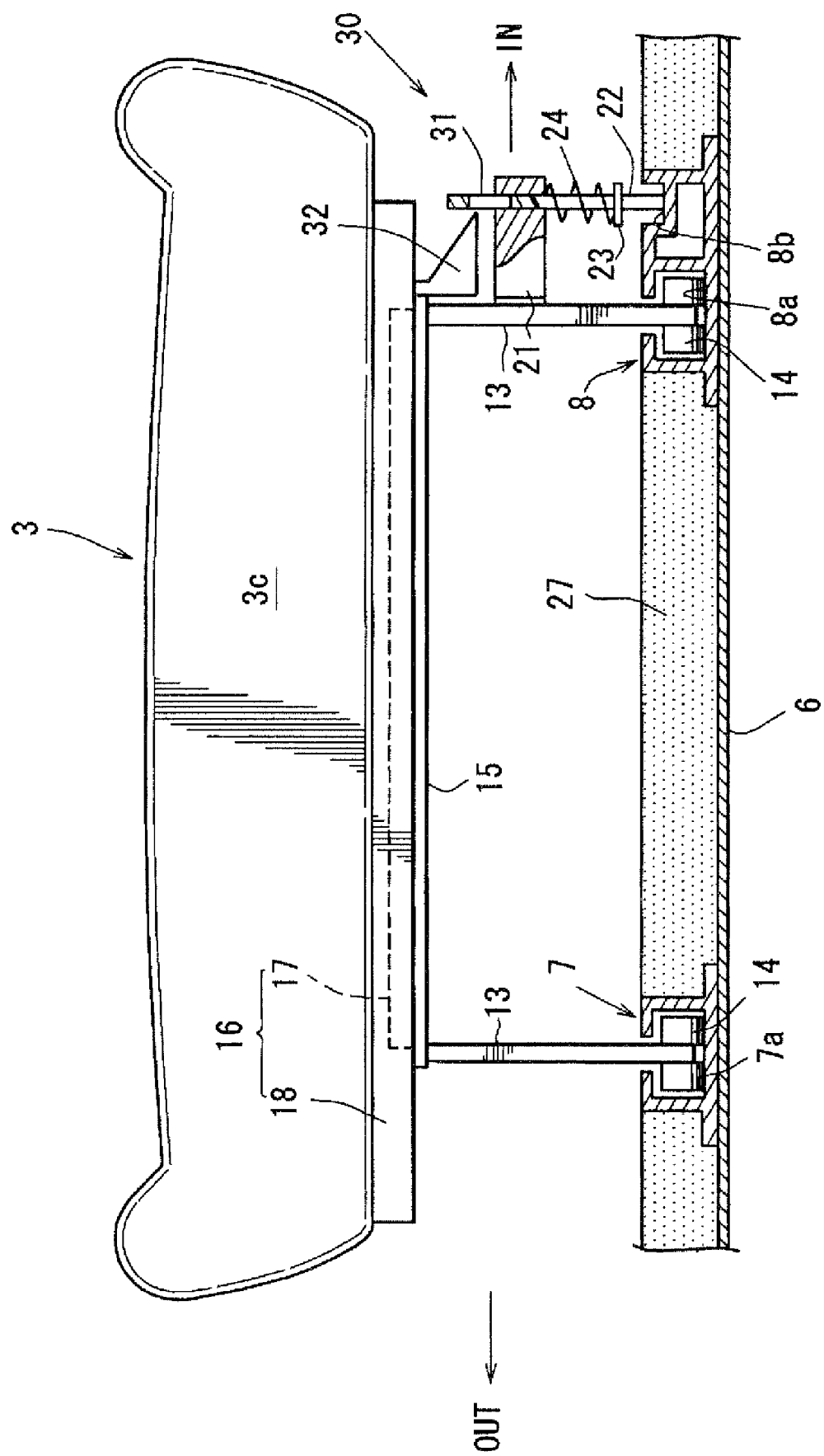
FIG. 8 is an elevation view of a right-side seat of a second-row seat of a seat device of a vehicle according to a second embodiment of the present invention.
Figure 9:
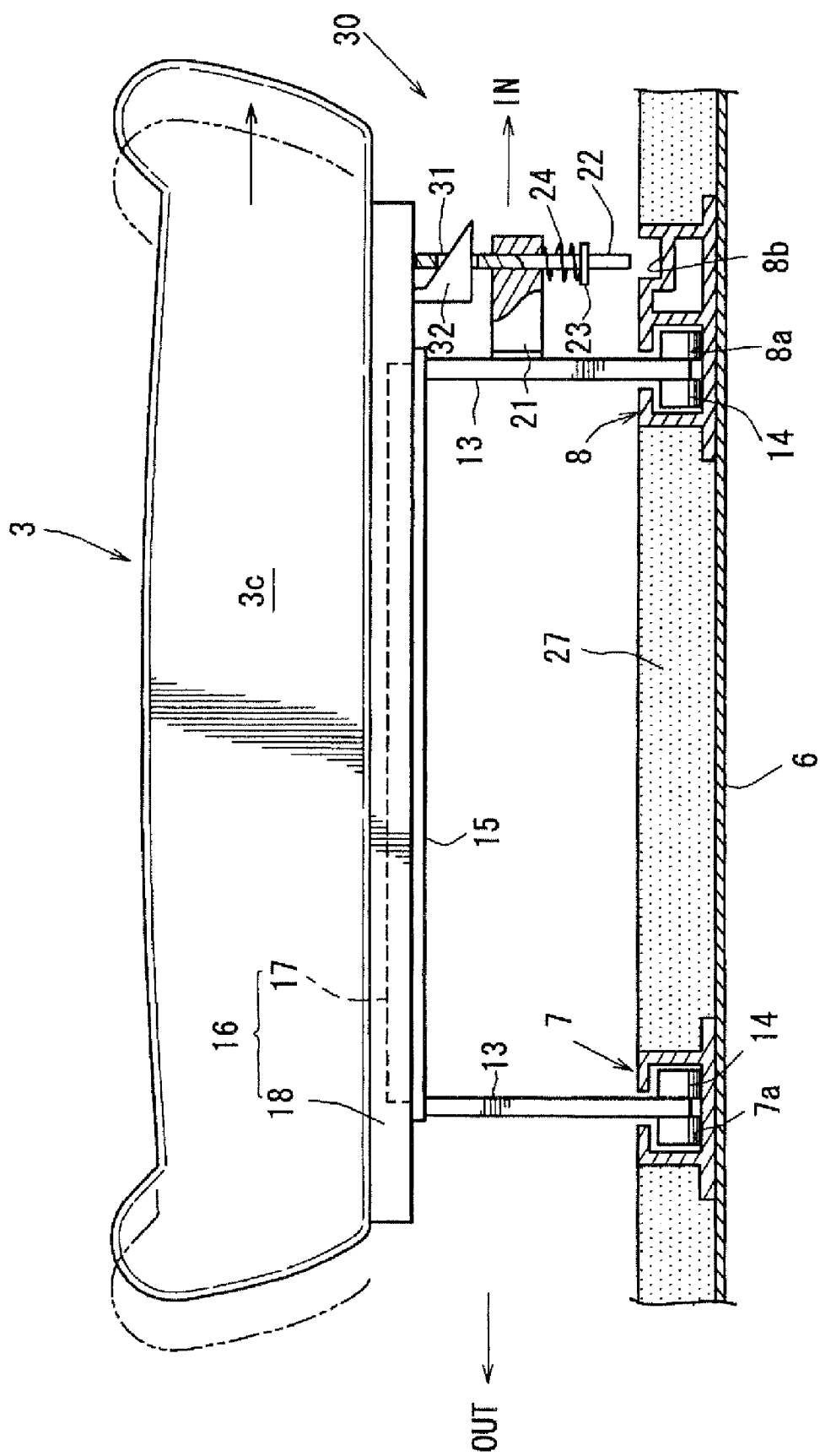
FIG. 9 is an elevation view in a state in which the seat of FIG. 8 is laterally slid inward.

FIGS. 8 and 9 show a seat device of a vehicle according to the second embodiment. In the present embodiment, when the seat cushion 3c is made slide inward from the first position shown in FIG. 8 as shown in FIG. 9, the stopper 22 as the engagement portion disengages from the recess groove 8b as the restriction portion.

According to a rearward-slide restriction device 30 shown in FIGS. 8 and 9, to an inside face of the inside seat leg 13 of the pair of seat legs 13, 13 is attached the stopper 22 that is movable vertically via the holder 21. And, the spring retainer 23 is provided at the lower portion of the stopper 22, and between the lower face of the spring retainer 23 and the lower face of the holder 21 is provided the coil spring 24 operative to bias the stopper 22 downward. Further, a through hole 31 is formed at an upper portion of the stopper 22.

A cam 32 is attached to the lower face of the inside portion of the upper rail 18 of the slide rail 16. This cam 32 is operative to pull up the stopper 22 with a cam face thereof getting into the through hole 31 when the seat cushion 3c slides inward so that the rear seat 3 is located in an inward position.

Herein, the above-described recess groove 8b is formed in the same manner as the recess groove 7b (see FIG. 3). Namely, the recess groove 8b is formed so as to extend longitudinally inside the rail groove 8a of the longitudinal slide rail 8 in parallel to the rail groove 8a. A restriction wall (not illustrated) like the restriction wall 7c (see FIG. 3) of the first embodiment is provided at a rear terminal portion of the recess groove 8b. Herein, the restriction wall of the second embodiment is located in front of the front end of the wheel house 9 by the specified distance L (see FIG. 3) as well. Although, only the right-side rear seat 3 of the second-row seat is shown in FIGS. 8 and 9, the left-side rear seat 4 (see the previous figure) is provided symmetrically relative to the seat structure of the right-side rear seat 3.

In the state shown in FIG. 8, namely when the seat cushion 3c is made slide outward to take the first position in which the outside portion of the seat cushion 3c overlaps with the wheel houses 9, 9 in the vehicle width direction, the cam 32 is of the through hole 31, so that the stopper 22 is down receiving the spring force of the coil spring 24 and the lower portion of the stopper 22 is in the recess groove 8b.

Accordingly, when the rear seat 3 is made slide rearward from the first position shown in FIG. 8, the rearward slide of the rear seat 3 is allowed until the stopper 22 contacts the restriction wall (equivalent to the restriction wall 7c shown in FIG. 3), but further rearward movement of that is restricted. Thereby, the interference of the rear seat 3 with the wheel house 9 is prevented.

Meanwhile, when the seat cushion 3c is made slide inward from the state shown in FIG. 8, the cam 32 gets into the through hole 31 and pulls up the stopper 22 with the cam face of the cam 32 as shown in FIG. 9, so that the lower portion of the stopper 22 gets out of the recess groove 8b and the engagement is released. Accordingly, the long slide of the rear seat 3 along the longitudinal slide rails 7, 8 becomes available in the state shown in FIG. 9.

Thus, according to the present embodiment shown in FIG. 8 and 9, the rear seat 3 comprises the seat cushion 3c which is supported so as to slide in the vehicle width direction, and the rearward-slide restriction device 30 comprises the restriction portion (see the recess groove 8b) that is provided at the floor panel 6 and the engagement portion (see the stopper 22) that is provided on the side of the seat cushion 3c so as to disengage from the restriction portion (see the recess groove 8b) when the seat cushion 3c slides inward from the first position (see FIG. 8) to the position (see FIG. 9).

Thereby, since the engagement portion (see the stopper 22) disengages from the restriction portion (see the recess groove 8b) to release the engagement between the both portions when the seat cushion 3c slides inward from the first position shown in FIG. 8, the restriction of the rearward slide of the seat can be disabled by using the inward lateral move of the seat cushion 3c.

Other structures, operations and advantages of the second embodiment shown in FIGS. 8 and 9 are the same as those of the above-described first embodiment. Thus, the same components are denoted by the same reference characters, specific descriptions of which are omitted here.

Embodiment 3

Figure 10:
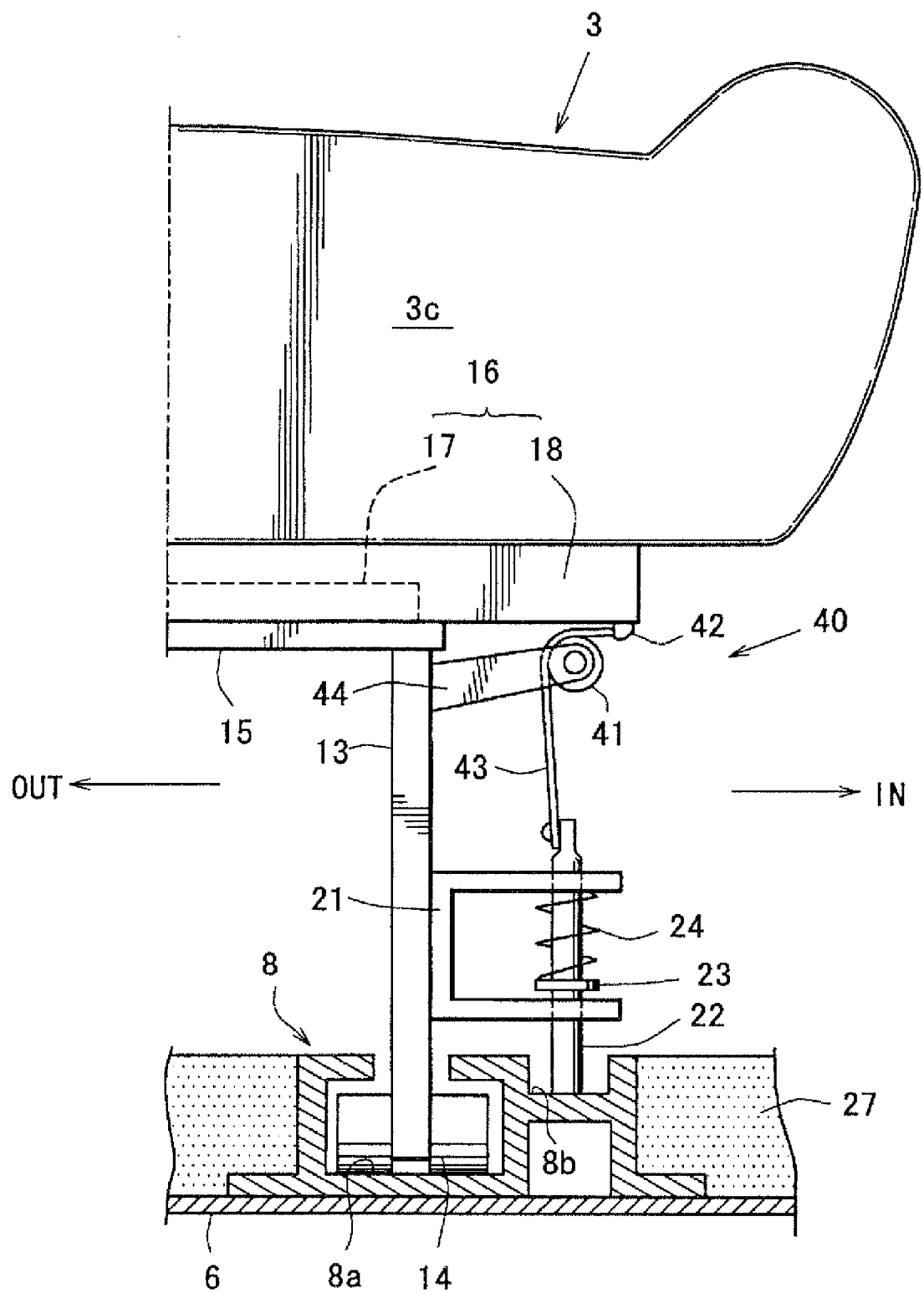
FIG. 10 is a partial elevation view of a right-side seat of a second-row seat of a seat device of a vehicle according to a third embodiment of the present invention.
Figure 11:
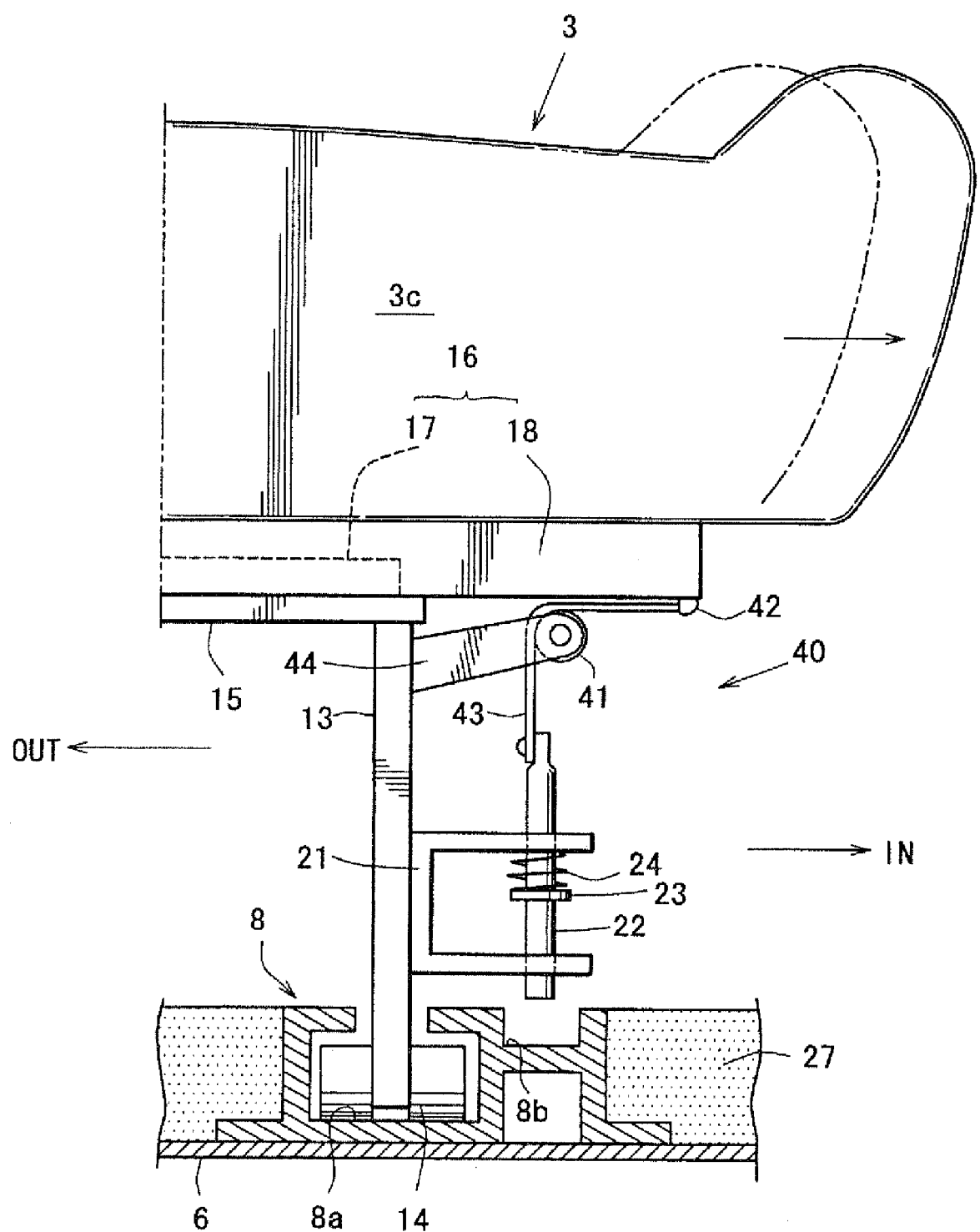
FIG. 11 is a partial elevation view in a state in which the seat of FIG. 10 is laterally slid inward.

FIGS. 10 and 11 show a seat device of a vehicle according to the third embodiment, which comprises the stopper 22 as the engagement portion, like the second embodiment, which disengages from the recess groove 8b as the restriction portion when the seat cushion 3c is made slide inward from the first position shown in FIG. 10 as shown in FIG. 11.

According to a rearward-slide restriction device 40 shown in FIGS. 10 and 11, to an inside face of the inside seat leg 13 of the pair of seat legs 13, 13 is attached the holder 22 that is of a U shape and has a guide hole for the stopper 22. The stopper 22 is provided so as to be movable vertically relative to the holder 21. And, the spring retainer 23 is provided at the middle portion of the stopper 22, and between the upper face of the spring retainer 23 and the lower face of the holder 21 is provided the coil spring 24 operative to bias the stopper 22 downward.

The seat leg 13 supports a wire guide roller 41 via a bracket 44. To an inside lower portion of the upper rail 18 (movable rail) of the lateral slide rail 16 are provided a wire stopper 42 and a wire 43 that is fixed with the wire stopper 42 and guided by the wire guide roller 41. A lower end of the wire 43 engages with an upper end of the stopper 22.

Herein, the structure of the longitudinal slide rail 8 is the same as that of the second embodiment, which comprises the rail groove 8a, the recess groove 8b in parallel to the rail groove 8a, and the restriction wall (equivalent to the restriction wall 7c of FIG. 3) formed at the rear terminal end of the recess groove 8b.

Although, only the right-side rear seat 3 of the second-row seat is shown in FIGS. 10 and 11, the left-side rear seat 4 is provided symmetrically relative to the seat structure of the right-side rear seat 3.

In the first position shown in FIG. 10, where the seat cushion 3c is made slide outward and the outside portion of the seat cushion 3c overlaps with the wheel houses 9 in the vehicle width direction, the wire stopper 42 is located above the stopper 22, so that the stopper 22 is down with the spring force of the coil spring 24 and the lower portion of the stopper 22 is in the recess groove 8b.

Accordingly, when the rear seat 3 is made slide rearward from the first position shown in FIG. 10, the rearward slide of the rear seat 3 is allowed until the stopper 22 contacts the restriction wall (equivalent to the restriction wall 7c shown in FIG. 3), but further rearward movement of that is restricted. Thereby, the interference of the rear seat 3 with the wheel house 9 is prevented.

Meanwhile, when the seat cushion 3c is made slide inward from the state shown in FIG. 10, the wire stopper 22 gets away from the stopper 22 and the wire 43 is pulled inward to pull up the stopper 22 as shown in FIG. 11, so that the lower portion of the stopper 22 gets out of the recess groove 8b and the engagement is released. Accordingly, the long slide of the rear seat 3 becomes available in the state shown in FIG. 11.

Thus, according to the present embodiment shown in FIGS. 10 and 11, the rear seat 3 comprises the seat cushion 3c which is supported so as to slide in the vehicle width direction, and the rearward-slide restriction device 40 comprises the restriction portion (see the recess groove 8b) that is provided at the floor panel 6 and the engagement portion (see the stopper 22) that is provided on the side of the seat cushion 3c so as to disengage from the restriction portion (see the recess groove 8b) when the seat cushion 3c slides inward from the first position (see FIG. 10) to the position (see FIG. 11).

Thereby, since the engagement portion (see the stopper 22) disengages from the restriction portion (see the recess groove 8b) to release the engagement between the both portions when the seat cushion 3c slides inward from the first position shown in FIG. 10, the restriction of the rearward slide of the seat can be disabled by using the inward lateral move of the seat cushion 3c.

Other structures, operations and advantages of the third embodiment shown in FIGS. 10 and 11 are the same as those of the above-described first or second embodiments. Thus, the same components are denoted by the same reference characters, specific descriptions of which are omitted here.

Herein, the constitution of the present invention corresponds to the above-described embodiments as follows: the seat corresponds to the rear seats 3, 4 of the second-row seat; the restriction portion corresponds to the recess grooves 7b, 8b; the engagement portion corresponds to the stopper 22; and the floor corresponds to the floor panel 6. However, the present invention should not be limited to the above-described embodiments.

Although the rearward-slide restriction device 20 of the first embodiment is attached to the outside seat leg 13 and the rearward-slide restriction devices 30, 40 of the second and third embodiments are attached to the inside seat leg 13, such attachment may be made revere in such a manner that the one of the first embodiment is attached to the inside seat leg 13 and the ones of the second and third embodiments are attached to the outside seat leg 13.

What is claimed is:

1. A seat device of a vehicle, comprising:
a seat provided in a vehicle compartment, the seat comprising a seat cushion and a seat base portion provided below the seat cushion to support the seat cushion;
a longitudinal slide rail arranged on a vehicle floor to support said seat such that the seat slides in a vehicle longitudinal direction between a pair of wheel houses, which are provided so as to project inside the vehicle compartment;
a lateral sidle rail arranged between the seat cushion and the seat base portion of said seat to support the seat cushion on the seat base portion such that the seat cushion slides in a vehicle width direction relative to the seat base portion;
wherein said seat is guided by said longitudinal slide rail and said lateral slide rail to take a first position in which the seat is located forward in the vehicle longitudinal direction and outward in the vehicle width direction, the first position overlapping with the wheel house in the vehicle width direction,
said seat is guided by said longitudinal slide rail so as to take a second position in which the seat is located rearward in the vehicle longitudinal direction between the pair of wheel houses, the second position overlapping with the wheel houses in the vehicle longitudinal direction; and
said seat device further comprises a rearward-slide restriction device to detect an outward slide of the seat to the first position by said lateral rail and restrict a rearward slide of the seat from the first position by said longitudinal slide rail beyond a specified amount of longitudinal slide of the seat.

2. The seat device of a vehicle of claim 1, wherein said rearward-slide restriction device comprises a recess groove that is provided at a vehicle floor so as to extend in the vehicle longitudinal direction along said longitudinal slide rail, a longitudinal length of the recess groove being substantially equivalent to said specified amount of longitudinal slide of the seat, and an engagement portion that is provided on a side of the seat cushion so as to engage with the recess groove when the seat cushion slides to the first position.

3. The seat device of a vehicle of claim 1, wherein said rearward-slide restriction device comprises a recess groove that is provided at a vehicle floor so as to extend substantially in the vehicle longitudinal direction longitudinal slide rail, a longitudinal length of the recess groove being substantially equivalent to said specified amount of longitudinal slide of the seat, and an engagement portion that is provided on a side of the seat cushion so as to disengage from the recess groove when the seat cushion slides inward from the first position.

4. The seat device of a vehicle of claim 1, wherein the seat is a second-row seat which comprises a pair of right and left seats that is provided independently in the vehicle compartment.

5. The seat device of a vehicle of claim 4, wherein in back of the second-row seat is provided a third-row seat which is storable behind the second-row seat.

* * * * *